(12) United States Patent
Schuh et al.

(10) Patent No.: US 10,524,609 B2
(45) Date of Patent: Jan. 7, 2020

(54) DISPOSABLE BEVERAGE POD AND APPARATUS FOR MAKING A BEVERAGE

(71) Applicant: Altria Client Services Inc., Richmond, VA (US)

(72) Inventors: Christian Schuh, Chesterfield, VA (US); Gerd Kobal, Sandy Hook, VA (US); Georgios D. Karles, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 14/202,772

(22) Filed: Mar. 10, 2014

(65) Prior Publication Data

US 2014/0272019 A1    Sep. 18, 2014

Related U.S. Application Data

(60) Provisional application No. 61/782,264, filed on Mar. 14, 2013.

(51) Int. Cl.
*A47J 31/40* (2006.01)
*B67D 1/00* (2006.01)
(Continued)

(52) U.S. Cl.
CPC ......... *A47J 31/4403* (2013.01); *A47J 31/401* (2013.01); *A47J 31/407* (2013.01); *A47J 43/04* (2013.01); *A47J 43/27* (2013.01); *B67D 1/0021* (2013.01); *B67D 1/0078* (2013.01); *B65D 81/32* (2013.01); *B67D 2001/0821* (2013.01); *B67D 2001/0827* (2013.01)

(58) Field of Classification Search
None
See application file for complete search history.

(56) References Cited

U.S. PATENT DOCUMENTS

| 3,332,779 | A | 7/1967 | Krabbe et al. |
| 3,798,331 | A | 3/1974 | Bavisotto et al. |

(Continued)

FOREIGN PATENT DOCUMENTS

| CN | 1802296 A | 7/2006 |
| CN | 101179972 A | 5/2008 |

(Continued)

OTHER PUBLICATIONS

Mother Nature Network, Creative ways to backpack with booze: Powdered beer. Captured Jan. 24, 2012. <https://web.archive.org/web/20120124030526/http://www.mnn.com/food/beverages/photos/creative-ways-to-backpack-with-booze/powdered-beer>.*

(Continued)

*Primary Examiner* — Viren A Thakur
*Assistant Examiner* — Thanh H Nguyen
(74) *Attorney, Agent, or Firm* — Buchanan Ingersoll & Rooney PC

(57) ABSTRACT

A disposable beverage pod includes a first compartment containing a beverage concentrate in dry or semi-dry form and a second compartment containing ethanol. An apparatus for making a single serving beverage is operable to receive the disposable beverage pod and mix the contents thereof with water from a water reservoir and optionally pressurized gas from a pressurized gas source to form a single serving beverage.

33 Claims, 2 Drawing Sheets

(51) Int. Cl.
*B67D 1/08* (2006.01)
*A47J 31/44* (2006.01)
*A47J 43/04* (2006.01)
*A47J 43/27* (2006.01)
*B65D 81/32* (2006.01)

(56) References Cited

U.S. PATENT DOCUMENTS

| | | |
|---|---|---|
| 3,822,729 A | 7/1974 | Rochette |
| 3,843,809 A | 10/1974 | Luck |
| 3,908,021 A | 9/1975 | Rehberger et al. |
| 4,021,580 A | 5/1977 | Raymond et al. |
| 4,180,589 A | 12/1979 | Chicoye et al. |
| 4,220,259 A | 9/1980 | Lagneaux |
| 4,440,795 A | 4/1984 | Goldstein et al. |
| 4,495,204 A | 1/1985 | Weaver et al. |
| 4,496,080 A | 1/1985 | Farber et al. |
| 4,497,348 A | 2/1985 | Sedam |
| 4,590,085 A | 5/1986 | Sidoti et al. |
| 4,626,437 A * | 12/1986 | Schobinger et al. ......... 426/387 |
| 4,810,505 A | 3/1989 | Pachernegg |
| 4,885,184 A | 12/1989 | Patino et al. |
| 5,082,143 A | 1/1992 | Schramm, Jr. |
| 5,341,957 A | 8/1994 | Sizemore |
| 5,618,572 A | 4/1997 | Tripp et al. |
| 5,731,981 A | 3/1998 | Simard |
| 6,354,190 B1 * | 3/2002 | Haydon ......................... 99/323 |
| 6,506,430 B1 | 1/2003 | Zimlich, III et al. |
| 6,607,013 B1 | 8/2003 | Leoni |
| 6,682,766 B2 | 1/2004 | Blumenstein-Stahl et al. |
| 6,758,130 B2 * | 7/2004 | Sargent et al. ................. 99/295 |
| 7,008,652 B2 | 3/2006 | Effler |
| 7,223,426 B2 | 5/2007 | Cheng et al. |
| 7,559,346 B2 | 7/2009 | Herrick et al. |
| 7,640,843 B2 * | 1/2010 | Halliday et al. ................ 99/295 |
| 7,891,286 B2 | 2/2011 | Scarchilli et al. |
| 7,989,014 B2 | 8/2011 | Van Der Ark et al. |
| 8,162,176 B2 | 4/2012 | Rudick |
| D670,539 S | 11/2012 | Starr et al. |
| 8,561,524 B2 | 10/2013 | Demigilo et al. |
| 8,586,117 B2 | 11/2013 | Vastardis et al. |
| 8,590,753 B2 | 11/2013 | Marina et al. |
| 8,673,384 B2 | 3/2014 | Kageyama et al. |
| 2002/0102345 A1 | 8/2002 | Ramirez |
| 2005/0130278 A1 * | 6/2005 | Mitsuhashi et al. .......... 435/125 |
| 2006/0118581 A1 | 6/2006 | Clark |
| 2006/0193947 A1 | 6/2006 | Anderson et al. |
| 2007/0205221 A1 | 9/2007 | Carpenter et al. |
| 2007/0231428 A1 | 10/2007 | Mensour et al. |
| 2007/0254603 A1 | 11/2007 | Aerts et al. |
| 2008/0193599 A1 | 8/2008 | Binder et al. |
| 2009/0028999 A1 | 1/2009 | Melisch et al. |
| 2009/0204473 A1 | 8/2009 | Sommerfeld |
| 2009/0317511 A1 | 12/2009 | Kawamata et al. |
| 2010/0047386 A1 | 2/2010 | Tatera |
| 2010/0221404 A1 | 9/2010 | Little |
| 2010/0308078 A1 | 12/2010 | Saveliev et al. |
| 2011/0011269 A1 | 1/2011 | Choi |
| 2011/0017776 A1 | 1/2011 | Metropulos et al. |
| 2011/0318459 A1 | 12/2011 | George et al. |
| 2012/0035761 A1 | 2/2012 | Tilton et al. |
| 2012/0114819 A1 | 5/2012 | Ragnarsson et al. |
| 2013/0064956 A1 | 3/2013 | Zeller et al. |
| 2013/0101724 A1 | 4/2013 | Kawamoto et al. |
| 2013/0233180 A1 | 9/2013 | Belmont |
| 2013/0239817 A1 | 9/2013 | Starr et al. |
| 2014/0272006 A1 | 9/2014 | Schuh et al. |
| 2015/0259634 A1 | 9/2015 | Marcq |
| 2016/0073673 A1 | 3/2016 | Schuh et al. |

FOREIGN PATENT DOCUMENTS

| | | |
|---|---|---|
| CN | 101195793 A | 6/2008 |
| CN | 101195794 A | 6/2008 |
| DE | 2145298 A1 | 3/1973 |
| DE | 196 19 370 A1 | 11/1997 |
| DE | 19813749 A1 | 10/1999 |
| DE | 20 2004 020 429 U1 | 6/2005 |
| DE | 10 2004 057 546 A1 | 2/2006 |
| EP | 1704803 A1 * | 9/2006 |
| GB | 2145427 A | 3/1985 |
| GB | 2261442 A | 5/1993 |
| GB | 2 454 558 A | 5/2009 |
| JP | H0661133 U | 8/1994 |
| JP | 2001128620 A * | 5/2001 |
| JP | 2013500209 A | 1/2013 |
| NZ | 546370 A | 8/2010 |
| WO | 9826997 A2 | 6/1998 |
| WO | WO 98/26997 A2 | 6/1998 |
| WO | 99/27070 A1 | 6/1999 |
| WO | 9927070 A1 | 6/1999 |
| WO | 02/02497 A1 | 1/2002 |
| WO | WO 2008/112737 A1 | 9/2008 |
| WO | 2014/152558 A2 | 9/2014 |

OTHER PUBLICATIONS

Definition of "Liquor", CollinsDictionary, Captured Aug. 14, 2012. <https://web.archive.org/web/20120814144231/http://www.collinsdictionary.com/dictionary/english/liquor>.*

Java Distribution, Roast & Coffe Characteristics: Character Description. Captured Apr. 16, 2011. <https://web.archive.org/web/20110416034251/http://www.javadistribution.com/roastscoffeecharacteristics/>.*

Whisky Science, Oaky Flavours, Posted Feb. 15, 2011. <http://whiskyscience.blogspot.com/2011/02/oakyflavours.html>.*

Bridgman-Smith, Curisosity Cabinet #8-Scotsmac, Instituteforalcoholicexperimentation, May 8, 2011 <http://instituteforalcoholicexperimentation.blogspot.com/2011/03/curiosity-cabinet-8-scotsmac.html>.*

Schlafly, Coffee Stout, Captured Feb. 11, 2011 <https://web.archive.org/web/20110211045849/http://www.schlafly.com/beers/styles/coffee-stout/>.*

Ford, The Irish Car Bomb, Liquor.com, captured May 13, 2012, <https://web.archive.org/web/20120513092527/http://liquor.com/recipes/the-irish-car-bomb/>.*

Brawn214, How to make declious coffee liqueur, Instructables, Cpatured Jul. 1, 2011, <https://web.archive.org/web/20110701001930/http://www.instructables.com/id/How-to-make-delicious-coffee-liqueur/>.*

Compound Interest, The chemical compounds beind the Aroma of Coffee, Aroma Chemistry. Feb. 2015 <http://www.compoundchem.com/2015/02/17/coffee-aroma/>.*

Flament, Table 4.5, Coffee Flavor Chemistry, John Wiley & Sons, LTD. 2002. p. 75.*

Cowie, Vodka-Espresso Cocktail, Delish, 2008 <http://www.delish.com/cooking/recipe-ideas/recipes/a1903/vodka-espresso-cocktail-drink-recipes/>.*

Beer Review, Beer and Vodka Together?, 2007 <http://beerreview.blogspot.com/2007/10/beer-and-vodka-together.html>.*

Rakoczy, Wine and Vodka Punch, love toknow, Captured 2011 <https://web.archive.org/web/20110718135538/http://cocktails.lovetoknow.com/Wine_and_Vodka_Punch>.*

Klimek, Turning Vodka Into WHhisky (sort of . . . ), Dramming, 2011 <http://www.dramming.com/2011/01/28/turning-vodka-into-whisky-sort-of/>.*

Kleinman, Jack Daniels Tennessee Honey Review, DrinkSpirits, <http://www.drinkspirits.com/liqueur/jack-daniels-tennessee-honey-review/> (Year: 2011).*

Farah, Coffee Constituents, Coffee:Emerging Health Effects and Disease Prevention, 1st Edition, p. 33-34 <https://www.ift.org/~/media/Knowledge%20Center/Publications/Books/Samples/IFTPressBook_Coffee_PreviewChapter.pdf> (Year: 2012).*

Green Coffee Center, Types of Acids in Coffee, <https://greencoffes.org/green-coffee-information/type-of-acids-in-coffee/> (Year: 2018).*

USDA, Basic Report: 14209, Beverages, coffee, brewed, prepared with tap water, <https://ndb.nal.usda.gov/ndb/foods/show/14209?

(56) References Cited

OTHER PUBLICATIONS fgcd=&manu=&format=&count=&max=25&offset=&sort=default&order=asc&qlookup=14209&ds=&qt=&qp=&qa=&qn=&q=&ing=> (Year: 2018).*

"Just Add Water and You Have Instant Beer", The Dispatch, Lexington, N.C., Aug. 13, 1963.

"Introducing Insta-Beer", www.kegworks.com/company/insta-beer.

"When Science Develops Instant Beer, Suds Quaffer Becomes Hopping Sad", Walson R. Portersfield, The Milwaukee Journal, Jul. 17, 1960.

The Siebel Institute of Technology; Specialty Sensory Traning Kit; hhttp://www.siebelinstitute.com/products-a-books/sensory-training-lits?page=shop.product details & fly page=flypage.tpl & product id=35 & category id=6.

Adventures in HomeBrewing; Flavored Extract Cans; http://www.homebrewing.org/flavored-Extract-Cans c 22.html.

Mr. Beer Home Brewing; Mr. Beer Kits; http://www.mrbeer.com/beer-kits.

Monster Brew; Beer and wine kits; http://www.monsterbrew.com/cat-IngredientKits.cfm.

Arne Glabasnia et al., "Sensory-Directed Indentification of Taste-Active Ellagitannins in American (*Quercus alba* L.) and European Oak Wood (*Quercus robur* L.) and Quantitative Analysis in Bourbon Whiskey and Oak-Matured Red Wines", Journal of Agricultural and Food Chemistry, Apr. 7, 2006, pp. 3380-3390, American Chemical Society.

Helge T. Fritsch et al., "Identfication Based on Quantitative Measurements and Aroma Recombination of the Character Impact Odorants in a Bavarian Pilsner-type Beer", Journal of Agricultural and Food Chemistry, Aug. 25, 2005 pp. 7544-7551, American Chemical Society.

Luici Poisson et al., "Characterization of the Most Odor-Active Compounds in an American Bourbon Whisky by Application of he Aroma Extract Dilution Analysis", Journal of Agricultural and Food Chemistry Jun. 21, 2008, pp. 5813-5819, American Chemical Society.

Luici Poisson et al., "Characterization of the Key Aroma Compounds in an American Bourbon Whisky by Quantitative Measurements, Aroma Recombination, and Omission Studies", Journal of Agricultural and Food Chemistry, Jun. 27, 2008, pp. 5813-5819, American Chemical Society.

Gesa Haseleu et al., "Structure Determination and Sensory Evaluation of Novel Bitter Compounds formed from β-acids of hop (*Humulus lupulus* L.) upon wort boiling" Food Chemistry, (2009), pages, Elsevier Ltd.

Invitation to Pay Additional Fees and Partial International Search for PCT/US2014/027473 dated Oct. 9, 2014.

Irwin et al., "A rapid method for the Extraction and Anaylsis of Beer Flavour Compponents," XP-002728436, Mar.-Apr. 1987, Journal of the Institute of Brewing, vol. 93, pp. 113-115.

Database FSTA, International Food Information Service, XP-002728437, Hanke et al., "Influence of ethyl acetate, isoamyl acetate and linalool on off-flavour perception in beer," 2011, 1 page, FS-2011-07-Hc3181.

U.S. Appl. No. 14/208,551, filed Mar. 13, 2014.

International Search Report and Written Opinion dated Jan. 30, 2015 for PCT/US2014/027473.

Ferreira, Vincente et al., "Chemical Characterization of the Aroma of Grenache Rosé Wines: Aroma Extract Dilution Analysis, Quantitative Determination, and Sensory Reconstitution Studies", J. Agric. Food Chem., 2002, 50, pp. 4048-4054.

Ferreira, Vincente et al., "Fast and Quantitative Determination of Wine Flavor Compounds Using Microextraction with Freon 113", J. Agric. Food Chem., Sep. 1993, 41, No. 9, pp. 1413-1420.

López, Ricardo et al., "Determination of minor and trace volatile compounds in wine by solid-phase extraction and gas chromatography with mass spectrometric detection", Journal of Chromatography A, 966, 2002, pp. 167-177.

Lee, Monica K. Y. et al., "Measurement of Thresholds for Reference Compounds for Sensory Profiling of Scotch Whisky", Journal of the Institute of Brewing, vol. 106, No. 5, 2000, pp. 287-294.

Lee, Monica K. Y. et al., "Origins of Flavour in Whiskies and a Revised Flavour Wheel: a Review", Journal of the Institute of Brewing, vol. 107, No. 5, 2001, pp. 287-313.

Poisson, Luigi et al., "Characterization of the Key Aroma Compounds in an American Bourbon Whisky by Quantitative Measurements, Aroma Recombination, and Omission Studies", J. Agric. Food Chem., 2008, 56, pp. 5820-5826.

Williams, A.A., "Recent Developments in the Field of Wine Flavour Research", Journal of the Institute of Brewing, Jan.-Feb. 1982, vol. 88, pp. 43-53.

International Search Report (Form PCT/ISA/210) and the Written Opinion of the International Searching Authority (Form PCT/ISA/237) dated Jun. 16, 2015, by the European Patent Office, in corresponding International Application No. PCT/US2015/020455. (9 pages).

Marcq et al., "Characterization of the Key Aroma Compounds in a Commercial Amontillado Sherry Wine by Means of the Sensomics Approach", Journal of Agricultural and Food Chemistry, (May 20, 2015), vol. 63, No. 19, pp. 4761-4770. (10 pages).

First Office Action with English Translation dated Dec. 5, 2016 in corresponding Chinese Patent Application No. 201480013860.7, 15 pages.

Office Action dated Nov. 6, 2017 in corresponding Japanese Patent Application No. 2016-501328, 9 pages.

Notification of Reasons for Refusal dated Aug. 21, 2018 in corresponding Japanese Application No. 2016-501328, and English translation of pertinent portions thereof.

* cited by examiner

DISPOSABLE BEVERAGE POD AND APPARATUS FOR MAKING A BEVERAGE

CROSS-REFERENCE TO RELATED APPLICATION

This application claims priority under 35 U.S.C. § 119(e) to U.S. provisional Application No. 61/782,264, filed on Mar. 14, 2013, the entire content of which is incorporated herein by reference thereto.

BACKGROUND

Beer concentrates and automatic bars are known in the art. Generally, beer concentrates can be in powder or liquid form. The beer concentrate can be mixed with water, carbon dioxide and optionally alcohol to form a beer beverage.

For example, U.S. Pat. No. 4,810,505 to Pachernegg discloses a process of preparing a carbonated hop-malt beverage from a wort concentrate. The wort concentrate can be mixed with water and carbon dioxide in a beverage dispenser including an outlet, carbonizer, metering device, mixer and packages containing the wort concentrate. However, Pachernegg fails to disclose an apparatus for making individual beverages including disposable beverage pods as described herein.

DE 2145298 to Beissner discloses beer that is freeze dried to form a beer powder. The beer powder can be mixed with water, carbon dioxide and alcohol to form a beer. However, Beissner also fails to disclose an apparatus for making individual beverages including disposable beverage pods as described herein.

A method and apparatus for quickly making a single serving alcoholic beverage from disposable beverage pods is desirable.

SUMMARY

A disposable beverage pod operable to be used with an apparatus for making a single serving flavored beverage is provided. The disposable beverage pod is a container comprising a first compartment operable to contain an alcohol-free beverage concentrate in dry or semi-dry form and a second compartment operable to contain ethanol in liquid form. Preferably, the first compartment and the second compartment are attached, but operable to maintain the alcohol-free beverage concentrate separately from the alcohol concentrate prior to use.

In a preferred embodiment, the beverage concentrate is a beer concentrate, a wine concentrate, a liquor concentrate or a mixed alcoholic drink concentrate.

In another preferred embodiment, the beverage concentrate comprises a flavor system consisting of one or more flavor compounds and optional colorants. The flavor system includes one or more compounds selected from the group consisting of myrcene, oak extract, octanoic acid, 2-methylpropanoic acid, butanoic acid, 3-methylbutanoic acid, 2-methylbutanoic acid, decanoic acid, hexanoic acid, 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, ethylfuraneol, 2-phenylethanol, 2-phenylacetic acid, 2-phenylethyl acetate, linalool, acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate, whiskey lactone, 2-methoxyphenol, 4-allyl-2-methoxyphenol, 5-pentyldihydrofuran-2(3H)-one, 4-ethyl-2-methoxyphenol, 4-methyl-2-methoxyphenol, 4-propyl-2-methoxyphenol, 5-hexyldihydrofuran-2(3H)-one, 3-hydroxy-4,5-dimethyl-2(5H)-furanone, dimethyl sulfide, dimethyltrisulfide, 3-(methylthio)-1-propanol, 3-(methylthio)-1-propanal, (E)-2-nonenal, (E,E)-2,4-decadienal, (E,E)-2,4-nonadienal, 4-ethylphenol, 4-methylphenol, 3-methylphenol, 2-methylphenol, phenol, tartaric acid, succinic acid, lactic acid, acetic acid, glycerol, glucose, fructose, L-proline, saccharose, potassium, magnesium, calcium, tannic acid, trans aconitic acid, hops extract, tetra-iso-extract 10%, rho-iso-extract 10%, isomerized hop extract 30%, carrageenan, whey protein, monosodium glutamate, maltodextrins, and combinations thereof.

Preferably, the beverage pod is in the form of a bag, cup or box having a first compartment and a second compartment therein. Also preferably, the bag, cup or box is formed of plastic, glass, and/or metal foil. In a preferred embodiment, the beverage pod is formed of a biodegradable material. Moreover, the first compartment and the second compartment can each include an opening mechanism such that the first compartment and the second compartment are simultaneously openable in the dispensing apparatus or prior to insertion into the dispensing apparatus in one or more locations by piercing, tearing, or removal of a lid portion from each of the first compartment and the second compartment. In addition, the beverage pod can include a third compartment operable to contain an additional beverage concentrate or other desirable ingredient.

A dispensing apparatus for making a single serving beverage is also provided. The apparatus comprises a water reservoir operable to supply water via a water supply line to an outlet of the apparatus, a beverage pod, and a housing operable to contain the water reservoir and beverage pod. The beverage pod comprises a first compartment operable to house a concentrated beverage and a second compartment operable to house concentrated alcohol. The apparatus can also include a pressurized gas source operable to supply pressurized gas to the outlet of the apparatus in an amount sufficient to form carbonation in the single serving beverage and a mixing unit operable to mix water from the water supply with the concentrated beverage and concentrated alcohol. The mixing unit can be contained in the housing and can include a mixing chamber where the beverage can be mixed. Alternatively, the mixing unit can extend from the housing into a container, such as a drinking vessel, and the ingredients can be individually dispensed from the outlet and mixed in the container. Moreover, the apparatus can include a container into which the beverage is poured from the outlet of the apparatus, the container being operable to form a seal with and/or around the outlet of the apparatus. Preferably, the apparatus also includes a control system operable to activate the apparatus and control functions of the apparatus, a cooling system operable to chill the single serving beverage, and a power supply. The pressurized gas source can be a carbon dioxide canister or a canister of pressurized nitrogen.

DETAILED DESCRIPTION

Figure 1:
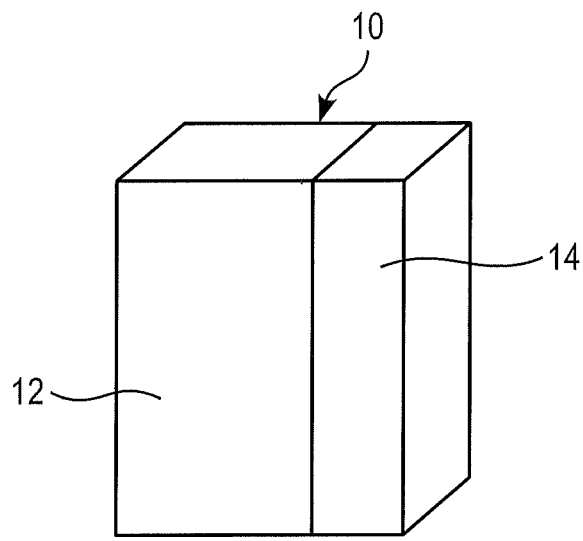
FIG. 1 is an illustration of a disposable beverage pod including a first compartment and a second compartment.

Flavor perception of a consumable product is defined as the combined impression of specific aroma, taste and trigeminal compounds along with entities that evoke mouth feel impressions such as astringency, mouth coating, fullness, etc. Aroma compounds are volatiles that interact with olfactory receptors in the nose evoking a signal to the brain interpreted as smell, while the five basic tastes are elicited by interactions of tastants with specific taste receptors for salt, sweet, bitter, sour and umami tastes, respectively.

In general, out of the many hundreds of chemical entities that are found in natural products, especially those of agricultural origin that may also have been subjected to additional fermentation or prolonged storage, only an order of ten may be responsible for aroma, taste and mouthfeel. Our state of the art separation, isolation and chemical analysis techniques have allowed us to identify and quantify those flavor relevant compounds out of the many hundreds that may be detected in a natural product. This sophisticated approach, called "sensomics", has been used extensively for the product categories outlined in this application.

A flavor that mimics exactly the sensory attributes of a certain product by using the same flavor compounds of the natural product is called "nature craft identical" and the combination of chemical entities that mimic the natural product is called "recombinant". Recombinants may be altered or new compounds added to compensate for flavor compounds that cannot be used due to toxicity (not generally recognized as safe (GRAS)) or availability issues and to create new superior flavors. Through omissions or additions of certain compounds in our "recombinants", we have also uncovered important interplays between aroma, flavor and mouthfeel impressions and have used this information to create the best possible nature craft identical product as outlined in the methods that follow. This approach is primarily based on chemical identification, receptor molecular biology and psychophysics and differs significantly from traditional trial and error artisan creations.

The flavor system and beverages made therefrom provide several advantages over conventional brewing, fermentation and other beverage making operations. First of all, while not wishing to be bound by theory, it is believed that compounds present in conventionally brewed and/or fermented beverages may be responsible for spoilage, thereby limiting the shelf-life of the conventional beverages. In contrast, the flavor system and resulting beverages as described herein can be tailored to exclude compounds responsible for spoilage. Moreover, other compounds in the conventional beverages could be carcinogenic. Such compounds, which may provide little flavor can be excluded from the flavor systems and beverages provided herein.

In addition, the use of flavor systems to form beverages as described herein allows for quick and easy customization of beverages as compared to conventional beverages and manufacturing systems.

A disposable beverage pod operable to be used with an apparatus for making a single serving flavored beverage is disclosed herein. The disposable beverage pod contains a beverage concentrate and ethanol. The disposable beverage pod can be used to form a beverage having the taste and/or aroma of various types of beers, wines, and/or liquors including whiskeys and scotches.

As used herein, the term "single serving" refers to an individual beverage serving having a size ranging from about 100 ml to about 1,500 ml (e.g., about 100 ml to about 1,200 ml, about 200 ml to about 1,000 ml, about 300 ml to about 800 ml, about 400 ml to about 700 ml or about 500 ml to about 600 ml).

As used herein, the term "flavor" refers to taste, aroma and sensation and is thus a mixture of tastants, aroma compounds and sensates. Thus, for example, the beverages formed herein which have the flavor of beer provide a mixture of tastants, aroma compounds and sensates which mimics that found in a traditionally brewed beer.

As used herein, the term "wine" describes any beverage formed by fermenting grapes and/or other fruits and vegetables.

As used herein, the term "beer" describes a beverage brewed by fermenting malt with sugar and yeast and flavoring with hops.

As used herein, the term "whiskey" describes a beverage made from fermented grain such as rye or barley, which can be aged or blended.

Figure 2:
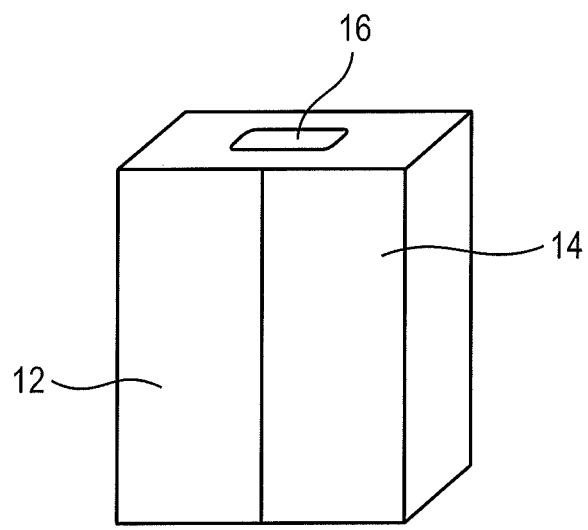
FIG. 2 is an illustration of disposable beverage pod including a first and second compartment and an opening mechanism.

As shown in FIG. 1, the disposable beverage pod 10 can include a first compartment 12 operable to house a beverage concentrate and a second compartment 14 operable to house ethanol. In the preferred embodiment, the first compartment 12 and the second compartment 14 maintain the beverage concentrate separately from the alcohol concentrate. As shown in FIG. 2, the disposable beverage pod can include a first compartment 12 and a second compartment 14 and one or more opening mechanisms 16. A consumer can choose to include the ingredients contained in only one of the first or second compartment 12, 14 if desired. Alternatively, the dispensing apparatus can be configured to open each compartment 12, 14 of the beverage pod. In another embodiment, the disposable beverage pod 10 can include additional compartments for containing ingredients which may benefit from being kept separated from the remaining ingredients prior to reconstitution or including colorants.

In the preferred embodiment, the beverage concentrate contained in the first compartment 12 is in a dry or semi-dry form. The beverage concentrate can include powders, granules, flakes, beads and the like of the various flavor compounds. Alternatively, the beverage concentrate could be in the form of a semi-liquid or gel. Also preferably, the concentrate is an alcohol-free concentrate of beer, wine, liquor or a mixed drink. The concentrate can be formed by conventional methods such as freeze drying, reverse osmosis and ultrafiltration as described in WO 99/27070 to Tripp, GB 2,261,442, DE 2145298, and U.S. Patent Application Publication No. 2010/0047386, the entire content of each of which is incorporated herein by reference thereto.

In the preferred embodiment, beverage concentrate is a concentrate of a flavor system. As used herein, the term "flavor system" describes one or more flavor compounds that are used in combination to create beverages having the flavor, mouthfeel and/or aromas of a wide variety of wines, beers, liquors, and/or mixed alcoholic beverages, but without the need for distillation, aging, fermentation, brewing and other costly and time consuming measures associated with the production of wine, beer and/or liquors.

The flavor system can be altered by substituting or adding additional flavor compounds, as described herein, to the flavor system. Thus, various flavor compounds can be combined to form a flavor system which will provide the same flavors and/or aromas as conventionally brewed, distilled, aged and/or fermented beer, wine, liquor or mixed beverages. The flavor system can be in liquid or dry form. Preferably, the flavor system is contained in the first compartment 12 of the beverage pod 10.

In the preferred embodiment, the flavor system 12 includes at least one (e.g., at least two, at least three, at least four, etc.) flavor compound from one or more (e.g., two or more, three or more, four or more, five or more, six or more, seven or more, eight or more, nine or more, ten or more, eleven or more or each) of the following aroma groups: (1) Cheesy, Sweaty Aroma Group, (2) Malty, Buttery and/or Sweet Aroma Group, (3) Floral and/or Honey Aroma Group, (4) Fruity Aroma Group, (5) Smoky, Coconut, Woody Aroma Group, (6) Cooked, Seasoning, Fatty Aroma Group, (7) Phenolic/Medicinal Aroma Group, (8) Sour Taste Group, (9) Sweet Taste Group, (10) Salty and Bitter Taste Group, (11) Astringent, Mouth Feel Group, (12) Bitter Taste Group and/or (13) Umami and Mouthfeel Taste Group.

However, if the flavor system is to be used to form a beverage which would not include flavor compounds from a particular group as shown in the tables below, none of those compounds would be included in the flavor system. The flavor groups can include volatile compounds which can impart certain aromas, tastes and sensations to the flavor system 12 and resulting beverage depending on the combination and concentration of the various aroma compounds included therein. The flavor compounds in each group are generally interchangeable with other compounds in the same group.

Moreover, certain compounds, particularly those in the Astringent, Mouth Feel Group may elicit mouth feel impressions such as tingling, mouth-puckering, smooth, velvety, mouth-coating, etc. In addition, certain compounds may affect the presentation of aromas and modulate the perceived aroma intensity.

The compounds included in each flavor and aroma group along with a range of the amount of each compound is shown in Tables 1-13 below.

As shown in Table 1, Flavor Group 1 includes seven compounds that can impart a cheesy or sweaty aroma to a beverage formed from the flavor system. The compounds of Flavor Group 1 are selected from the group consisting of octanoic acid, 2-methylpropanoic acid, butanoic acid, 3-methylbutanoic acid, 2-methylbutanoic acid, decanoic acid, hexanoic acid and combinations thereof. The range of each compound of Flavor Group 1 that can be included in any beverage formed from the flavor system 12, the range of each compound for inclusion in a wine-like beverage formed from the flavor system 12, the range of each compound for inclusion in whiskey-like beverage formed from the flavor system 12 and the range of each compound for inclusion in beer-like beverages formed from the flavor system 12 in micrograms per liter (µg/l) is shown. Moreover, as shown, the compounds of Flavor Group 1 are not desirable for inclusion in whiskey-like beverages. Thus, a flavor system for use to create a whiskey beverage would not include aroma compounds from Flavor Group 1. In addition, each of the Flavor Group 1 compounds can be substituted for other compounds in the same group to achieve a similar aroma.

TABLE 1

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 1 cheesy, sweaty aroma | octanoic acid | 250 | 10,000 | 250 | 10,000 | 0 | 0 | 250 | 5,000 |
| | 2-methylpropanoic acid | 200 | 10,000 | 200 | 10,000 | 0 | 0 | 200 | 5,000 |
| | butanoic acid | 200 | 15,000 | 200 | 15,000 | 0 | 0 | 200 | 10,000 |
| | 3-methylbutanoic acid | 100 | 10,000 | 200 | 10,000 | 0 | 0 | 100 | 5,000 |
| | 2-methylbutanoic acid | 50 | 10,000 | 100 | 10,000 | 0 | 0 | 50 | 2,000 |
| | decanoic acid | 50 | 2,000 | 50 | 2,000 | 0 | 0 | 50 | 1,000 |
| | hexanoic acid | 300 | 15,000 | 300 | 15,000 | 0 | 0 | 300 | 10,000 |

As shown in Table 2, Flavor Group 2 includes eleven compounds that can impart a malty, buttery and/or sweet aroma to a beverage formed from the flavor system 12. The compounds of Flavor Group 2 are selected from the group consisting of 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, ethylfuraneol and combinations thereof. The range of each compound of Flavor Group 2 that can be included in any flavor system 12, the range of each compound for inclusion in a flavor system 12 for forming a wine-like beverage, the range of each compound for inclusion in a flavor system 12 for forming a whiskey-like beverage and the range of each compound for inclusion in a flavor system 12 for forming a beer-like beverage in micrograms per liter (µg/l) is shown. Moreover, each of the Flavor Group 2 compounds can be substituted for other compounds in the same group to achieve a similar aroma.

TABLE 2

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 2- malty, buttery, | 3-methylbutanol | 5,000 | 5,000,000 | 30,000 | 1,500,000 | 100,000 | 5,000,000 | 5,000 | 250,000 |
| | 2-methylbutanol | 5,000 | 5,000,000 | 30,000 | 1,500,000 | 100,000 | 5,000,000 | 5,000 | 250,000 |
| | 2,3-butanedione | 5 | 50,000 | 100 | 50,000 | 5 | 200 | 100 | 50,000 |
| | vanilline | 1 | 10,000 | 200 | 10,000 | 500 | 25,000 | 1 | 50 |

TABLE 2-continued

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| sweet aroma | 2-methylpropanol | 5,000 | 5,000,000 | 5,000 | 250,000 | 100,000 | 5,000,000 | 5,000 | 5,000,000 |
| | 3-methylbutanal | 3 | 2,000 | 10 | 1,000 | 20 | 2,000 | 3 | 150 |
| | 2,3-pentanedione | 1 | 50,000 | 1 | 50,000 | 1 | 50,000 | 1 | 50,000 |
| | 2-methylpropanal | 1 | 1000 | 5 | 500 | 20 | 1,000 | 1 | 50 |
| | 2-methylbutanal | 0.5 | 8,000 | 20 | 2,000 | 100 | 8,000 | 0.5 | 25 |
| | furaneol | 10 | 1,500 | 10 | 1,000 | 10 | 1,000 | 30 | 1,500 |
| | ethylfuraneol | 0.5 | 100 | 0.5 | 50 | 0.5 | 50 | 2 | 100 |

As shown in Table 3, Flavor Group 3 includes five compounds that can impart a floral and/or honey aroma to a beverage formed from the flavor system 12. The compounds of Flavor Group 3 are selected from the group consisting of 2-phenylethanol, 2-phenylacetic acid, 2-phenylethyl acetate, linalool, myrcene and combinations thereof. The range of each compound of Flavor Group 3 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. Moreover, each of the Flavor Group 3 compounds can be substituted for other compounds in the same group to achieve a similar aroma.

formed from the flavor system 12. The compounds of Flavor Group 4 are selected from the group consisting of acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate and combinations thereof. The range of each compound of Flavor Group 4 that can be included in the flavor system for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. Moreover, each of the Flavor Group 4

TABLE 3

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 3- Floral, honey | 2-phenylethanol | 1,000 | 200,000 | 1,000 | 200,000 | 5,000 | 200,000 | 1,500 | 75,000 |
| | 2-phenylacetic acid | 10 | 1,500 | 10 | 750 | 10 | 1,000 | 25 | 1,500 |
| | 2-phenylethyl acetate | 5 | 10,000 | 5 | 500 | 100 | 10,000 | 5 | 500 |
| | linalool | 0.5 | 10,000 | 0.5 | 500 | 0.5 | 500 | 10 | 10,000 |
| | myrcene | 500 | 50,000 | 0 | 0 | 0 | 0 | 500 | 50,000 |

As shown in Table 4, Flavor Group 4 includes eleven compounds that can impart a fruity aroma to a beverage compounds can be substituted for other compounds in the same group to achieve a similar aroma.

TABLE 4

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 4- fruity aroma | acetaldehyde | 500 | 300,000 | 1,000 | 50,000 | 3,000 | 300,000 | 500 | 25,000 |
| | ethyl butyrate | 10 | 5,000 | 10 | 750 | 100 | 5,000 | 20 | 1,000 |
| | ethyl-2-methylpropanoate | 0.3 | 2,500 | 5 | 500 | 50 | 2,500 | 0.3 | 15 |
| | ethyl octanoate | 5 | 25,000 | 5 | 2,000 | 500 | 25,000 | 20 | 1,000 |
| | ethyl hexanoate | 5 | 10,000 | 5 | 2,000 | 100 | 10,000 | 20 | 1,000 |
| | ethyl-3-methylbutyrate | 0.04 | 500 | 1 | 50 | 10 | 500 | 0.04 | 2 |
| | ethyl-2-methylbutyrate | 0.06 | 500 | 0.5 | 50 | 10 | 500 | 0.06 | 3 |
| | (E)-b-damascenone | 0.1 | 100 | 0.1 | 5 | 1 | 100 | 0.2 | 10 |
| | 3-methylbutyl acetate | 300 | 25,000 | 300 | 10,000 | 500 | 25,000 | 300 | 15,000 |
| | 1,1-diethoxyethane | 5 | 10,000 | 50 | 2,000 | 2,000 | 100,000 | 5 | 250 |
| | trans-ethyl cinnamate | 0.2 | 100 | 0.2 | 10 | 1 | 100 | 0.2 | 10 |

As shown in Table 5, Flavor Group 5 includes eight compounds that can impart a smoky, coconut, and/or woody aroma to a beverage formed from the flavor system 12. The compounds of Flavor Group 5 are selected from the group consisting of whiskey lactone, 2-methoxyphenol, 4-allyl-2-methoxyphenol, 5-pentyldihydrofuran-2(3H)-one, 4-ethyl-2-methoxyphenol, 4-methyl-2-methoxyphenol, 4-propyl-2-methoxyphenol, 5-hexyldihydrofuran-2(3H)-one, and combinations thereof. The range of each compound of Flavor Group 5 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. However, as shown, when creating a flavor system for forming a beverage having the flavor of beer, whiskey lactone, 5-pentyldihydrofuran-2(3H)-one, and 5-hexyldihydrofuran-2(3H)-one would not be included. Moreover, each of the Flavor Group 5 compounds can be substituted for other compounds in the same group to achieve a similar aroma.

TABLE 5

| | | Range in Any Beverage | | Range for Inclusion in Wine | | Range for Inclusion in Whiskey | | Range for Inclusion in Beer | |
|---|---|---|---|---|---|---|---|---|---|
| Category descriptor | compound | low μg/l | high μg/l | low μg/l | high μg/l | low μg/l | high μg/l | low μg/l | high μg/l |
| Flavor Group 5- Smoky, coconut, woody aroma | whiskey lactone | 50 | 50,000 | 50 | 2,000 | 1,000 | 50,000 | 0 | 0 |
| | 2-methoxyphenol | 0.1 | 10,000 | 0.1 | 200 | 20 | 10,000 | 0.1 | 500 |
| | 4-allyl-2-methoxyphenol | 0.1 | 1,000 | 0.1 | 100 | 20 | 1,000 | 0.1 | 500 |
| | 5-pentyldihydrofuran-2(3H)-one | 2 | 500 | 2 | 100 | 10 | 500 | 0 | 0 |
| | 4-ethyl-2-methoxyphenol | 0.5 | 5,000 | 0.5 | 50 | 20 | 5,000 | 0.5 | 1,000 |
| | 4-methyl-2-methoxyphenol | 0.5 | 10,000 | 0.5 | 50 | 10 | 10,000 | 0.5 | 1,000 |
| | 4-propyl-2-methoxyphenol | 0.5 | 500 | 0.5 | 50 | 2 | 500 | 0.5 | 1,000 |
| | 5-hexyldihydrofuran-2(3H)-one | 0.3 | 70 | 0.3 | 10 | 1 | 70 | 0 | 0 |

As shown in Table 6, Flavor Group 6 includes eight compounds that can impart a cooked, seasoning and/or fatty aroma to a beverage formed from the flavor system 12. The compounds of Flavor Group 6 are selected from the group consisting of 3-hydroxy-4,5-dimethyl-2(5H)-furanone, dimethyl sulfide, dimethyltrisulfide, 3-(methylthio)-1-propanol, 3-(methylthio)-1-propanal, (E)-2-nonenal, (E,E)-2,4-decadienal, (E,E)-2,4-nonadienal and combinations thereof. The range of each compound of Flavor Group 6 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. However, when forming a beverage having the flavor of a whiskey, dimethyl sulfide and dimethyltrisulfide would not be included in the flavor system. Moreover, each of the Flavor Group 6 compounds can be substituted for other compounds in the same group to achieve a similar aroma.

TABLE 6

| | | Range in Any Beverage | | Range for Inclusion in Wine | | Range for Inclusion in Whiskey | | Range for Inclusion in Beer | |
|---|---|---|---|---|---|---|---|---|---|
| Category descriptor | compound | low μg/l | high μg/l | low μg/l | high μg/l | low μg/l | high μg/l | low μg/l | high μg/l |
| Flavor Group 6- cooked, seasoning, fatty aroma | 3-hydroxy-4,5-dimethyl-2(5H)-furanone | 0.1 | 25 | 0.5 | 25 | 0.1 | 5 | 0.1 | 5 |
| | dimethyl sulfide | 1 | 250 | 1 | 50 | 0 | 0 | 5 | 250 |
| | dimethyltrisulfide | 0.02 | 2 | 0.02 | 2 | 0 | 0 | 0.02 | 2 |
| | 3-(methylthio)-1-propanol | 250 | 10,000 | 250 | 10,000 | 250 | 10,000 | 100 | 5,000 |
| | 3-(methylthio)-1-propanal | 0.05 | 10 | 0.1 | 10 | 0.1 | 10 | 0.05 | 5 |
| | (E)-2-nonenal | 1 | 100 | 1 | 100 | 1 | 100 | 1 | 100 |
| | (E,E)-2,4-decadienal | 1 | 100 | 1 | 100 | 1 | 100 | 1 | 100 |
| | (E,E)-2,4-nonadienal | 0.1 | 10 | 0.1 | 10 | 0.1 | 10 | 0.1 | 10 |

As shown in Table 7, Flavor Group 7 includes five compounds that can impart a phenolic and/or medicinal aroma to a beverage formed from the flavor system 12. The compounds of Flavor Group 7 are selected from the group consisting of 4-ethylphenol, 4-methylphenol, 3-methylphenol, 2-methylphenol, phenol, and combinations thereof. The range of each compound of Flavor Group 7 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. As shown, the compounds of Flavor Group 7 are not desirable for inclusion in wine or beer type beverages produced using the flavor system 12 described herein. Thus, the aroma compounds of Flavor Group 7 would not be used in flavor systems designed to form beverages having the flavor of a wine, beer or cider. Moreover, each of the Flavor Group 7 compounds can be substituted for other compounds in the same group to achieve a similar aroma.

TABLE 7

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 7- phenolic, medicinal aroma | 4-ethylphenol | 50 | 10,000 | 0 | 0 | 50 | 10,000 | 0 | 0 |
| | 4-methylphenol | 1 | 10,000 | 0 | 0 | 1 | 10,000 | 0 | 0 |
| | 3-methylphenol | 1 | 8,000 | 0 | 0 | 1 | 8,000 | 0 | 0 |
| | 2-methylphenol | 1 | 20,000 | 0 | 0 | 1 | 20,000 | 0 | 0 |
| | phenol | 50 | 20,000 | 0 | 0 | 50 | 20,000 | 0 | 0 |

As shown in Table 8, Flavor Group 8 includes five compounds that can impart a sour taste to a beverage formed from the flavor system 12. The compounds of Flavor Group 8 are selected from the group consisting of tartaric acid, succinic acid, lactic acid, citric acid, acetic acid, and combinations thereof. The range of each compound of Flavor Group 8 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. As shown, the compounds of Flavor Group 8 are not desirable for inclusion in whiskey or beer type beverages produced using the flavor system 12 described herein. Thus, the flavor compounds of Flavor Group 8 would only be included in flavor systems designed to form beverages having the flavor of wine. Moreover, each of the Flavor Group 8 compounds can be substituted for other compounds in the same group to form a flavor system 12 which produces a beverage having a similar taste.

TABLE 8

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 8- sour taste | tartaric acid | 200,000 | 10,000,000 | 300,000 | 10,000,000 | 0 | 0 | 0 | 0 |
| | succinic acid | 200,000 | 5,000,000 | 250,000 | 5,000,000 | 0 | 0 | 0 | 0 |
| | lactic acid | 200,000 | 7,500,000 | 300,000 | 7,500,000 | 0 | 0 | 0 | 0 |
| | citric acid | 200,000 | 7,500,000 | 300,000 | 7,500,000 | 0 | 0 | 200,000 | 7,500,000 |
| | acetic acid | 50,000 | 4,000,000 | 75000 | 4,000,000 | 0 | 0 | 50,000 | 40,000,000 |

As shown in Table 9, Flavor Group 9 includes five compounds that can impart a sweet taste to a beverage. The compounds of Flavor Group 9 are selected from the group consisting of glycerol, glucose, fructose, L-proline, saccharose, and combinations thereof. The range of each compound of Flavor Group 9 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. Moreover, each of the Taste Group 2 compounds can be substituted for other compounds in the same group to form a flavor system which produces a beverage having a similar taste.

TABLE 9

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 9- sweet taste | glycerol | 50,000 | 50,000,000 | 2,500,000 | 50,000,000 | 2,000,000 | 10,000,000 | 50,000 | 5,000,000 |
| | glucose | 20,000 | 500,000 | 20,000 | 500,000 | 0 | 0 | 20,000 | 500,000 |
| | fructose | 100,000 | 10,000,000 | 100,000 | 10,000,000 | 0 | 0 | 100,000 | 10,000,000 |
| | L-proline | 100,000 | 10,000,000 | 100,000 | 10,000,000 | 0 | 0 | 100,000 | 10,000,000 |
| | saccharose | 500,000 | 10,000,000 | 500,000 | 10,000,000 | 0 | 0 | 500,000 | 10,000,000 |

As shown in Table 10, Flavor Group 10 includes three compounds that can impart a salty and/or bitter taste to a flavor system for forming a beverage. The compounds of Flavor Group 10 are selected from the group consisting of potassium, magnesium, calcium, and combinations thereof. The range of each compound of Flavor Group 10 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. As shown, the compounds of Flavor Group 10 are not desirable for inclusion in whiskey type beverages produced using the flavor system 12 described herein. Moreover, each of the Flavor Group 10 compounds can be substituted for other compounds in the same group to form a flavor system 12 which produces a beverage having a similar taste.

TABLE 10

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low μg/l | high μg/l | low μg/l | high μg/l | low μg/l | high μg/l | low μg/l | high μg/l |
| Flavor Group 10- Salty, Bitter taste | potassium | 300,000 | 10,000,000 | 300,000 | 10,000,000 | 0 | 0 | 300,000 | 8,000,000 |
| | magnesium | 50,000 | 2,000,000 | 50,000 | 2,000,000 | 0 | 0 | 50,000 | 2,000,000 |
| | calcium | 25,000 | 500,000 | 25,000 | 500,000 | 0 | 0 | 25,000 | 500,000 |

As shown in Table 11, Flavor Group 11 includes three compounds that can impart an astringent mouth feel to a flavor system 12 for forming a beverage. The compounds of Flavor Group 11 are selected from the group consisting of tannic acid, trans aconitic acid, oak extract, and combinations thereof. The range of each compound of Flavor Group 11 that can be included in the flavor system 12 for forming any beverage, the range of each compound in a flavor system for forming a wine-like beverage, the range of each compound in a flavor system 12 for forming a whiskey-like beverage and the range of each compound in a flavor system 12 for forming a beer-like beverage in micrograms per liter (μg/l) is shown. As shown, the compounds of Flavor Group 11 are not desirable for inclusion in beverages having the flavor of beer as produced using the flavor system 12 described herein. Moreover, each of the Flavor Group 11 compounds can be substituted for other compounds in the same group to form a flavor system 12 which produces a beverage having a similar taste.

TABLE 11

| Category descriptor | compound | Range in Any Beverage low μg/l | Range in Any Beverage high μg/l | Range for Inclusion in Wine low μg/l | Range for Inclusion in Wine high μg/l | Range for Inclusion in Whiskey low μg/l | Range for Inclusion in Whiskey high μg/l | Range for Inclusion in Beer low μg/l | Range for Inclusion in Beer high μg/l |
|---|---|---|---|---|---|---|---|---|---|
| Flavor Group 11- Astringent mouth feel | tannic acid | 30,000 | 150,000 | 30,000 | 150,000 | 30,000 | 150,000 | 0 | 0 |
| | trans aconitic acid | 500 | 25,000 | 500 | 25,000 | 500 | 2,500 | 0 | 0 |
| | Oak extract | 1,000,000 | 5,000,000 | 1,000,000 | 5,000,000 | 1,000,000 | 5,000,000 | 0 | 0 |

As shown in Table 12, Flavor Group 12 includes four compounds that can impart a bitter taste to a flavor system 12 for forming a beverage. The compounds of Flavor Group 12 are selected from the group consisting of hops extract, tetra-iso-extract 10%, rho-iso-extract 10%, isomerized hop extract 30%, and combinations thereof. The range of each compound of Flavor Group 12 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (μg/l) is shown. As shown, the compounds of Flavor Group 12 are not desirable for inclusion in wine and whiskey type beverages produced using the flavor system 12 described herein. Moreover, each of the Flavor Group 12 compounds can be substituted for other compounds in the same group to form a flavor system 12 which produces a beverage having a similar taste.

TABLE 12

| Category descriptor | compound | Range in Any Beverage low μg/l | Range in Any Beverage high μg/l | Range for Inclusion in Wine low μg/l | Range for Inclusion in Wine high μg/l | Range for Inclusion in Whiskey low μg/l | Range for Inclusion in Whiskey high μg/l | Range for Inclusion in Beer low μg/l | Range for Inclusion in Beer high μg/l |
|---|---|---|---|---|---|---|---|---|---|
| Flavor Group 12- bitter taste | hops extract | 1,000,000 | 30,000,000 | 0 | 0 | 0 | 0 | 1,000,000 | 30,000,000 |
| | Tetra-Iso-Extract 10% | 25,000 | 650,000 | 0 | 0 | 0 | 0 | 25,000 | 650,000 |
| | Rho-Iso-Extract 10% | 25,000 | 650,000 | 0 | 0 | 0 | 0 | 25,000 | 650,000 |
| | Isomerized hop extract 30% | 10,000 | 250,000 | 0 | 0 | 0 | 0 | 10,000 | 250,000 |

As shown in Table 13, Flavor Group 13 includes four compounds that can impart umami and/or mouth feel to a flavor system 12 for forming a beverage. The compounds of Flavor Group 13 are selected from the group consisting of carrageenan, whey protein, monosodium glutamate, maltodextrin, and combinations thereof. The range of each compound of Flavor Group 13 that can be included in the flavor system 12 for forming any beverage, the range of each compound in a flavor system 12 for forming a wine-like beverage, the range of each compound in a flavor system 12 for forming a whiskey-like beverage and the range of each compound in a flavor system 12 for forming a beer-like beverage in micrograms per liter (µg/l) is shown. As shown, the compounds of Flavor Group 13 are not desirable for inclusion in wine and whiskey type beverages produced using the flavor system 12 described herein. Moreover, each of the Flavor Group 13 compounds can be substituted for other compounds in the same group to form a flavor system 12 which produces a beverage having a similar taste.

In other embodiments, the beverage having a beer flavor can include at least one (e.g., at least two, at least three, or at least four) compound from one or more of the remaining flavor groups.

Preferably, a beverage having a whiskey taste and/or mouth feel includes at least one (e.g., at least two, at least three, or at least four) compound from flavor group 4 (fruity flavor), at least one (e.g., at least two, at least three, or at least four) compound from flavor group 5 (smoky, coconut, woody flavor), at least one (e.g., at least two, at least three, or at least four) compound from flavor group 7 (phenolic, medicinal) and at least one (e.g., at least two, at least three, or at least four) compound from flavor group 11 (astringent mouth feel). In other embodiments, the beverage having a whiskey flavor can include at least one (e.g., at least two, at least three, or at least four) compound from one or more of the remaining flavor groups.

TABLE 13

| Category descriptor | compound | Range in Any Beverage | | Range for Inclusion in Wine | | Range for Inclusion in Whiskey | | Range for Inclusion in Beer | |
|---|---|---|---|---|---|---|---|---|---|
| | | low µg/l | high µg/l | low µg/l | high µg/l | low µg/l | high µg/l | low µg/l | high µg/l |
| Flavor Group 13-Umami taste, mouthfeel | carrageenan | 50,000 | 1,500,000 | 0 | 0 | 0 | 0 | 50,000 | 15,00,000 |
| | whey protein | 10,000 | 250,000 | 0 | 0 | 0 | 0 | 10,000 | 250,000 |
| | monosodium glutamate | 30,000 | 750,000 | 0 | 0 | 0 | 0 | 30,000 | 750,000 |
| | maltodextrin | 3,000,000 | 70,000,000 | 0 | 0 | 0 | 0 | 3,000,000 | 70,000,000 |

By including one or more (e.g., two or more, three or more, four or more, five or more, six or more, etc.) compounds from the one or more (e.g., two or more, three or more, four or more, five or more, six or more, seven or more, eight or more, nine or more, ten or more, eleven of more, or twelve or more) of the flavor groups, the flavor system can be tailored to provide a beverage concentrate which mimics the taste and/or mouth feel of various beers, wines, liquors, including whiskey, and mixed beverages. The choice of flavor compounds and the amount included in the flavor system allows a user and/or manufacturer to adjust the flavor of the beverage to be created using the flavor system. Thus, the flavor system can be used to create a beverage having the taste of a wide variety of wines, beers or liquors.

Preferably, a beverage having a wine taste and/or mouth feel includes at least one (e.g., at least two, at least three, or at least four) compound from flavor group 4 (fruity flavor), at least one (e.g., at least two, at least three, or at least four) compound from flavor group 5 (smoky, coconut, woody flavor), at least one (e.g., at least two, at least three, or at least four) compound from flavor group 8 (sour flavor), and at least one (e.g., at least two, at least three, or at least four) compound from flavor group 11 (astringent mouth feel). In other embodiments, the beverage having a wine flavor can include at least one (e.g., at least two, at least three, or at least four) compound from one or more of the remaining flavor groups.

Preferably, a beverage having a beer taste and/or mouth feel includes at least one (e.g., at least two, at least three, or at least four) compound from flavor group 2 (malty, buttery, sweet flavor), at least one (e.g., at least two, at least three, or at least four) compound from flavor group 3 (floral, honey flavor), and at least one (e.g., at least two, at least three, or at least four) compound from flavor group 12 (bitter flavor).

The examples provided below are exemplary and are not meant to limit any aspects of the embodiments disclosed herein.

Example 1

For example, a red wine having the flavor of a Cabernet Sauvignon can be made by combining 3,000 µg/l of octanoic acid, 2,500 µg/l of 2-methylpropanoic acid, 5,000 µg/l of 3-methylbutanoic acid, 5,000 µg/l of 2-methylbutanoic acid, 2,000 µg/l of hexanoic acid, 150,000 µg/l of 3-methylbutanol, 150,000 µg/l of 2-methylbutanol, 1,000 µg/l of 2,3-butanedione, 500 µg/l of vanilline, 5,000 µg/l of 2,3-pentanedione, 100 µg/l of furaneol, 150 µg/l of 2-phenylacetic acid, 2,000 µg/l of acetaldehyde, 100 µg/l of ethyl butyrate, 100 µg/l of ethyl hexanoate, 10 µg/l of ethyl-3-methylbutyrate, 10 µg/l of ethyl-2-methylbutyrate, 1 µg/l of (E)-b-damascenone, 500 µg/l of whiskey lactone, 30 µg/l of 2-methoxyphenol, 20 µg/l of 3-allyl-2-methoxyphenol, 4,000 µg/l of 3-(methylthio)-1-propanol, 2,000,000 µg/l of tartaric acid, 1,000,000 of succinic acid, 750,000 µg/l of acetic acid, 15,000,000 µg/l of glycerol, 2,000,000 µg/l of L-proline, 1,000,000 µg/l of potassium, 80,000 µg/l of tannic acid, 2,000,000 µg/l of oak extract, 10,000,000 µg/l of ethanol and water. Optionally, colorants can be added to provide a wine beverage having a pleasing color.

Example 2

In another example, an American style whiskey can be made by combining 1,000,000 µg/l of 3-methylbutanol, 500,000 µg/l of 2-methylbutanol, 5,000 µg/l of vanilline, 500 µg/l of 3-methylbutanal, 10,000 µg/l of 2-phenylethanol, 1,000 µg/l of 2-phenylacetic acid, 3,000 µg/l of 2-phenylethyl acetate, 500 µg/l of ethyl butyrate, 10,000 µg/l of ethyl octanoate, 200 µg/l of ethyl-2-methylbutyrate, 10 µg/l of (E)-b-damascenone, 2,500 µg/l of 3-methylbutyl acetate, 15,000 µg/l of 1,1-diethoxyethane, 5,000 µg/l of whiskey lactone, 50 µg/l of 2-methoxyphenol, 400 µg/l of 4-allyl-2-methoxyphenol, 300 µg/l of 5-pentyldihydrofuran-2(3H)-one, 15 µg/l of 4-methyl-2-methoxyphenol, 5 µg/l of 5-hexyldihydrofuran-2(3H)-one, 40 µg/l of (E,E)-2,4-decadienal, 5 µg/l of (E,E)2,4-nonadienal, 150 µg/l of 4-ethylphenol, 10 µg/l of 4-methylphenol, 5,000,000 µg/l of glycerol, 100,000 µg/l of tannic acid, 4,000,000 µg/l of oak extract, 316,000,000 µg/l of ethanol and water.

Example 3

In another example, a pilsner-type beer can be made by combining (E)-b-damascenone in an amount of about 3 µg/l, 2-methylbutanoic acid in an amount of about 2,000 µg/l, 2-phenylethanol in an amount of about 10,000 µg/l, 3-(methylthio)propanol in an amount of about 1,000 µg/l, 3-methylbutanoic acid in an amount of about 2,000 µg/l, 3-methylbutanal in an amount of about 200 µg/l, 3-methylbutanol in an amount of about 50,000 µg/l, dimethyl sulfide in an amount of about 150 µg/l, ethyl butyrate in an amount of about 200 µg/l, ethyl hexanoate in an amount of about 200 µg/l, ethyl octanoate in an amount of about 150 µg/l, furaneol in an amount of about 500 µg/l, 2-phenylacetic acid in an amount of about 500 µg/l, 3-hydroxy-4,5-dimethyl-2 (5H)-furanone in an amount of about 5 µg/l, 3-methylbutanol in an amount of about 50,000 µg/l, 2-methylbutanol in an amount of about 50,000 µg/l, ethylfuraneol in an amount of about 100 µg/l, linalool in an amount of about 300 µg/l, 4-allyl-2-methoxyphenol in an amount of about 150 µg/l, 3-(methylthio)-1-propanal in an amount of about 5 µg/l, citric acid in an amount of about 400,000 µg/l, saccharose in an amount of about 1,500,000 µg/l, potassium in an amount of about 1,500,000 µg/l, hops extract in an amount of about 5,000,000 µg/l, isomerized hops extract 30% in an amount of about 100,000 µg/l, monosodium glutamate in an amount of about 100,000 µg/l, ethanol in an amount of about 37,500,000 µg/l and water.

Example 4

A light pilsner-type beer can be made by combining (E)-b-damascenone in an amount of about 3 µg/l, 2-methylbutanoic acid in an amount of about 2,000 µg/l, 2-phenylethanol in an amount of about 10,000 µg/l, 3-(methylthio)propanol in an amount of about 1,000 µg/l, 3-methylbutanoic acid in an amount of about 2,000 µg/l, 3-methylbutanal in an amount of about 200 µg/l, 3-methylbutanol in an amount of about 50,000 µg/l, dimethyl sulfide in an amount of about 150 µg/l, ethyl butyrate in an amount of about 200 µg/l, ethyl hexanoate in an amount of about 200 µg/l, ethyl octanoate in an amount of about 150 µg/l, furaneol in an amount of about 500 µg/l, 2-phenylacetic acid in an amount of about 500 µg/l, 3-hydroxy-4,5-dimethyl-2(5H)-furanone in an amount of about 5 µg/l, 3-methylbutanol in an amount of about 50,000 µg/l, 2-methylbutanol in an amount of about 50,000 µg/l, ethylfuraneol in an amount of about 100 µg/l, linalool in an amount of about 300 µg/l, 4-allyl-2-methoxyphenol in an amount of about 150 µg/l, 3-(methylthio)-1-propanal in an amount of about 5 µg/l, citric acid in an amount of about 400,000 µg/l, saccharose in an amount of about 1,500,000 µg/l, potassium in an amount of about 1,500,000 µg/l, hops extract in an amount of about 5,000,000 µg/l, isomerized hops extract 30% in an amount of about 100,000 µg/l, monosodium glutamate in an amount of about 100,000 µg/l, ethanol in an amount of about 33,100,000 µg/l and water.

By altering the amount and variety of flavor compounds in the above example, other types of beers including lagers, ales, porters, pale ales, lambics, hefeweizens and other types of beers, wines, and/or whiskeys can be made.

Advantageously, the beverages created using the flavor system and method described herein have fewer calories than a traditionally brewed, distilled, aged, and/or fermented beverage having substantially the same flavor characteristics. As shown in Table 14, the pilsner-type of Example 3 has fewer calories than commercially brewed and fermented beers. The calorie count for the commercially brewed beers was obtained from www.beer100.com/beercalorie and is based on a 12 ounce beverage. The calorie count of the beer of Example 3 is based on the following: ethanol: 7 kcal/g and carbohydrates: 4 kcal/g.

TABLE 14

| Beer Brand | total kcal | alcohol kcal | carbs kcal |
|---|---|---|---|
| BUDWEISER | 145 | 97 | 42.4 |
| MILLER GENUINE DRAFT | 143 | 91 | 52.4 |
| SAM ADAMS BOSTON LAGER | 160 | 92 | 72 |
| Pilsner-type beer of Example 3 | 100 | 92 | 8 |

As shown in Table 15, the light pilsner-type beer of Example 4 has fewer calories than commercially brewed and fermented light beers. The calorie count for the commercially brewed beers was obtained from www.beer100.com/beercalorie and is based on a 12 ounce beverage. The calorie count of the beer of Example 4 is based on the following: ethanol: 7 kcal/g and carbohydrates: 4 kcal/g.

TABLE 15

| Beer Brand | total kcal | alcohol kcal | carbs kcal |
|---|---|---|---|
| BUD LIGHT | 110 | 81 | 26.4 |
| MILLER LITE | 96 | 81 | 12.8 |
| Light pilsner-type beer of Example 4 | 89 | 81 | 8 |

As shown both the pilsner-type beverage of Example 3 and the light pilsner-type beverage of Example 4 provide a beverage having at least 7% fewer calories than a conventionally brewed and/or fermented beverage having a similar flavor. Preferably, the beverages formed as described herein will have at least 5% fewer calories (e.g., at least 10% fewer calories, at least 15% fewer calories, at least 20% fewer calories, at least 25% fewer calories) than traditionally brewed and/or fermented beverages having similar flavors.

Also preferably, the alcohol concentrate contained in the second compartment 14, 14' of the disposable beverage pod 10 is ethanol, which is in liquid form. The alcohol concentrate is included in the second compartment 14 in amount sufficient to form a single serving beverage having an alcohol content ranging from about 0.1% alcohol by volume to about 80% alcohol by volume. For example, wine can have an alcohol content of about 0.1% alcohol by volume to about 25% alcohol by volume, whiskey can have about 50% alcohol by volume to about 70% alcohol by volume and beer can have about 2% alcohol by volume to about 20% alcohol by volume. The amount of alcohol concentrate can be selected based on the type of beverage being formed and/or can be controlled by a control system of the apparatus used to form the beverage if the adult consumer wishes to have a beverage having a lower alcohol content that that contemplated when forming the beverage pod 10.

In a preferred embodiment, the alcohol concentrate can also include flavor compounds that are better dissolved and/or preserved in alcoholic solutions.

Preferably, the beverage pod 10 is in the form of a bag, cup or box, which can be made of plastic, glass or other suitable materials. Also preferably, the material used to form the beverage pod is biodegradable. Moreover, the material used to form the beverage pod is moisture impermeable so as to prevent leaking of the alcohol concentrate and/or addition of moisture to the beverage concentrate prior to use. In another embodiment, the first compartment 12 can be formed of a porous fabric material such as that used to make coffee filters. Such a material is effective to maintain the beverage concentrate in dry form within the first compartment 12.

Preferably, the first compartment 12 is sealed and the second compartment 14 are sealed during manufacture of the beverage pod 10.

In use, the first compartment 12 and the second compartment 14 are manually opened at one or more locations before insertion in the beverage making apparatus. Alternatively, the first compartment 12 and/or the second compartment 14 can be opened at one or more locations upon activation of the beverage making apparatus. Thus, the first compartment 12 and/or the second compartment 14 can include one or more opening mechanisms 16, such as a lid or weakened area which can be pierced, torn or removed by the apparatus so as to release the beverage concentrate and/or alcohol concentrate upon activation of the apparatus or prior to placement in the apparatus.

Once the beverage concentrate is combined with the ethanol concentrate, a quantity of water and optionally carbon dioxide, a beverage is formed. In one embodiment, the adult consumer can instruct the beverage dispensing apparatus to dispense less than or none of the ethanol concentrate that is included in the second compartment 14 of the beverage pod 10.

Figure 3:
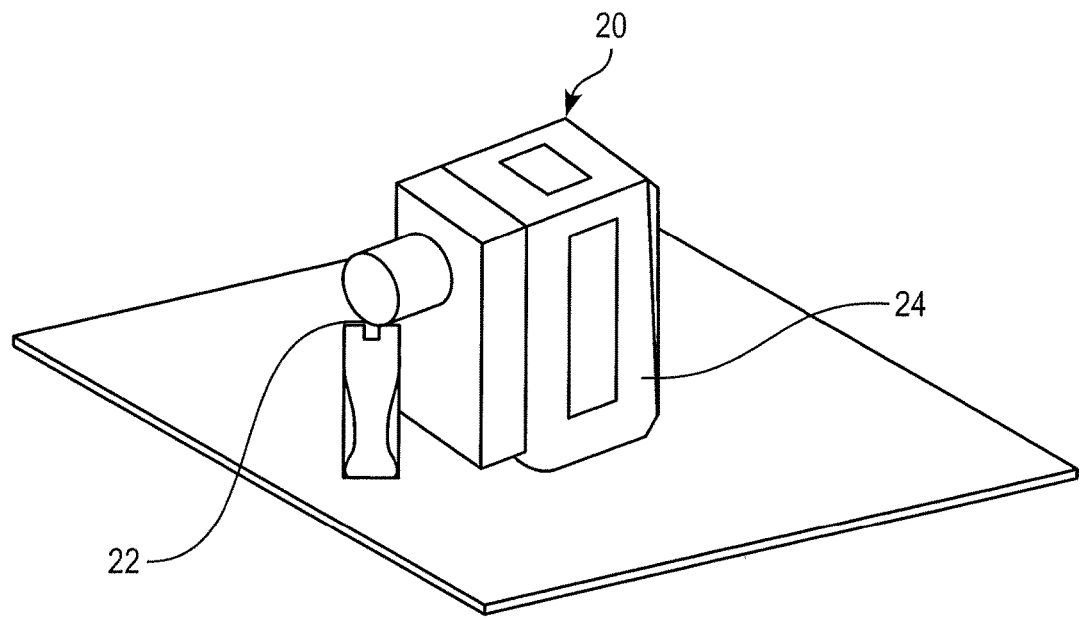
FIG. 3 is an illustration of an apparatus for making a beverage using the disposable beverage pods of FIGS. 1 and/or 2.

As shown in FIG. 3, an apparatus 20 for making a beverage from the beverage pod 10 includes a housing 24 which houses the mechanical and electronic components of the apparatus 20. The apparatus 20 also includes an outlet 22 from which the beverage is dispensed. Preferably, the housing 24 can be formed of plastic and/or metal.

The apparatus 20 can be a compact, counter sized device or a larger device for use in restaurants, bars or other establishments which serve beverages.

Figure 4:
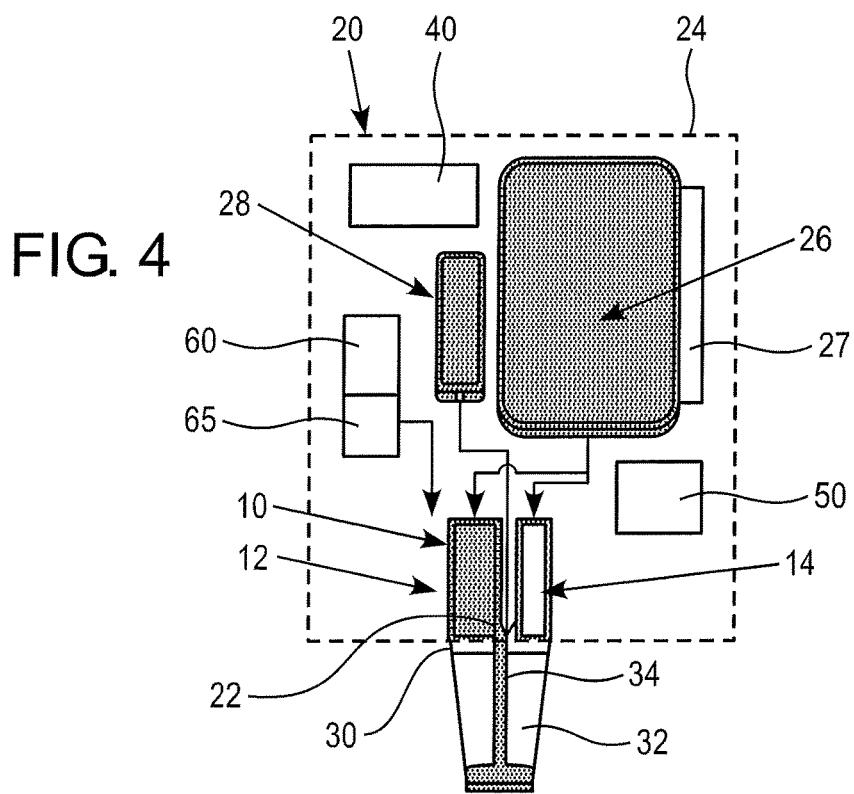
FIG. 4 is diagram of the apparatus of FIG. 3.

Preferably, as shown in FIG. 4, the apparatus 20 includes a water reservoir 26, which is used to supply the water necessary for making a serving of a beverage. Alternatively, instead of a water reservoir 26, the apparatus 20 can include a water line connected to an external water supply source. In one embodiment, the water reservoir 26 or the water line can be cooled before mixing by a cooling system 27 so as to provide a chilled beverage if desired. The cooling system 27 can include a heat exchanger or other apparatus which is operable to cool the water.

Also preferably, the apparatus 20 includes a pressurized gas canister 28, which is used to supply carbonation if desired. Preferably, the canister 28 is replaceable. The pressurized gas canister 28 preferably houses carbon dioxide. However, in an alternative embodiment, the pressurized gas canister 28 can include nitrogen. Preferably, the amount of carbonation provided by the pressurized gas canister 28 can be controlled depending on the preference as to the level of carbonation of the adult consumer (e.g., low, medium, or high levels of carbonation). For example, the user can use input a desired level of carbonation into a control system 40 and the control system 40 can control the amount of pressurized gas to be released from the canister 28.

In one embodiment, the apparatus 20 can include a mixing unit 34, which can include a mixing chamber (not shown). The mixing unit 34 can be housed in the housing 24 and can be operable to receive water, pressurized gas, beverage concentrate and alcohol concentrate prior to dispensing the beverage via the outlet. Alternatively, the mixing unit 24 can extend from the apparatus 20 (e.g., a blender) into the container into which the beverage ingredients are emptied so as to mix the beverage during and/or after dispensing.

In addition, the apparatus 20 can include an external mixing container 32 which can form a seal 30 with and/or around the outlet 22 of the apparatus 20 when the mixing unit 34 extends from the housing 24. Such a container 32 should be able to withstand pressurization attributed to use of the pressurized gas.

The apparatus 20 can also include a control system 60 and a user interface 65, which allows a user to input system requirements including the desired amount of carbonation, desired alcohol content, optional chilling of the drink, mixing of the drink and other such functions. The apparatus can also include a power supply 50 operable to provide power to the apparatus 20 during use. The power supply 50 can include a battery or an AC adapter.

Preferably, the housing 24 can include openings therein to replace the beverage pods, add water to a water reservoir and replace a pressurized gas source if necessary.

In use, an adult consumer, bartender or waiter can place a disposable beverage pod of their choice in the apparatus 20, activate the apparatus 20 using the user interface 65 and await dispensing of their beverage. Water from the water supply 26 and pressurized gas from the pressurized gas source 40 are dispensed simultaneously or in series to the mixing unit 34 where the pressurized gas and water are mixed with the flavor system and alcohol. If the mixing unit 34 is within the housing 24, the beverage is then dispensed from the apparatus 20 via the outlet 22. Alternatively, the ingredients can each be dispensed into a container 32 and mixed therein using the mixing unit 24 which extends from the apparatus 20 into the mixing container 32 during dispensing and mixed therein. Once the beverage is formed, the beverage can be placed is a drinking vessel for consumption by an adult consumer.

In this specification, the word "about" is often used in connection with numerical values to indicate that mathematical precision of such values is not intended. Accordingly, it is intended that where "about" is used with a numerical value, a tolerance of ±10% is contemplated for that numerical value.

While the foregoing describes in detail a method and apparatus for forming a beverage with reference to a specific embodiment thereof, it will be apparent to one skilled in the art that various changes and modifications and equivalents to the apparatus and method may be employed, which do not materially depart from the spirit and scope of the invention.

We claim:

1. A beverage pod configured to be received in a receptacle of an apparatus for making a single serving alcoholic beverage, the beverage pod comprising:
a first compartment including a first flavor system in liquid, dry, semi-dry, semi-liquid, or gel form sealed therein, the first flavor system including a combination of compounds which impart aromas, tastes, and/or sensations to a single serving alcoholic beverage formed from the beverage pod; and a second compartment consisting of a liquid consisting of a predetermined amount of an alcohol concentrate sealed therein, wherein the alcohol concentrate is selected from the group consisting of ethanol, or a mixture of water and ethanol;

wherein the first flavor system, when combined with at least the predetermined amount of the alcohol concentrate, forms the single serving alcoholic beverage having a predetermined flavor, mouthfeel, and aroma.

2. The beverage pod of claim 1, wherein the first flavor system is a beer flavor system, which forms a single serving alcoholic beverage having the flavor, mouthfeel, and aroma of beer when combined with the predetermined amount of the alcohol concentrate, a predetermined amount of water, and carbon dioxide or nitrogen.

3. The beverage pod of claim 1, wherein the first flavor system is a wine flavor system, which forms a single serving alcoholic beverage having the flavor, mouthfeel, and aroma of wine when combined with the predetermined amount of the alcohol concentrate and a predetermined amount of water.

4. The beverage pod of claim 1, wherein the first flavor system is a whiskey or scotch flavor system, which forms a single serving alcoholic beverage having the flavor, mouthfeel, and aroma of whiskey or scotch when combined with the predetermined amount of the alcohol concentrate and a predetermined amount of water.

5. The beverage pod of claim 1, wherein the first flavor system comprises colorants.

6. The beverage pod of claim 4, wherein the first flavor system includes four or more compounds selected from the group consisting of oak extract, myrcene, octanoic acid, 2-methylpropanoic acid, butanoic acid, 3-methylbutanoic acid, 2-methylbutanoic acid, decanoic acid, hexanoic acid, 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, ethylfuraneol, 2-phenylethanol, 2-phenylacetic acid, 2-phenylethyl acetate, linalool, acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate, whiskey lactone, 2-methoxyphenol, 4-allyl-2-methoxyphenol, 5-pentyldihydrofuran-2(3H)-one, 4-ethyl-2-methoxyphenol, 4-methyl-2-methoxyphenol, 4-propyl-2-methoxyphenol, 5-hexyldihydrofuran-2(3H)-one, 3-hydroxy-4,5-dimethyl-2(5H)-furanone, dimethyl sulfide, dimethyltrisulfide, 3-(methylthio)-1-propanol, 3-(methylthio)-1-propanal, (E)-2-nonenal, (E,E)-2,4-decadienal, (E,E)-2,4-nonadienal, 4-ethylphenol, 4-methylphenol, 3-methylphenol, 2-methylphenol, phenol, tartaric acid, succinic acid, lactic acid, acetic acid, glycerol, glucose, fructose, L-proline, saccharose, potassium, magnesium, calcium, tannic acid, trans aconitic acid, hops extract, tetra-iso-extract 10%, rho-iso-extract 10%, isomerized hop extract 30%, carrageenan, whey protein, monosodium glutamate, and maltodextrins.

7. The beverage pod of claim 1, wherein the beverage pod is in the form of a bag, cup or box.

8. The beverage pod of claim 7, wherein the bag, cup or box is made of plastic, glass, and/or metal foil.

9. The beverage pod of claim 1, wherein each of the first compartment and the second compartment includes an opening mechanism such that the first compartment and the second compartment are openable by piercing, tearing, or removal of a lid portion from each of the first compartment and the second compartment before placement in an apparatus for making a single serving alcoholic beverage or during use of the apparatus for making a single serving alcoholic beverage.

10. The beverage pod of claim 1, wherein the beverage pod is formed of a biodegradable material.

11. The beverage pod of claim 1, further including a third compartment containing an additional flavor system in liquid, dry, semi-dry, semi-liquid, or gel form sealed therein, the additional flavor system including a combination of compounds which impart aromas, tastes, and/or sensations to a single serving alcoholic beverage formed from the beverage pod, and optional colorants.

12. The beverage pod of claim 1, further including a third compartment containing one or more additional flavor compounds.

13. The beverage pod of claim 1, wherein the first flavor system, and a resulting single serving alcoholic beverage formed therefrom excludes one or more compounds that contribute to spoilage.

14. The beverage pod of claim 1, wherein the beverage pod provides a single serving alcoholic beverage having about 89 kcal.

15. The beverage pod of claim 1, wherein the first flavor system is a whiskey or scotch flavor system, and the predetermined amount of the alcohol concentrate and a predetermined amount of water are selected such that a formed single serving alcoholic beverage has a predetermined alcohol content ranging from about 50% alcohol by volume to about 80% alcohol by volume.

16. The beverage pod of claim 1, wherein the alcohol concentrate is ethanol.

17. A beverage pod configured to be received in a receptacle of an apparatus for making an alcoholic beverage, the beverage pod comprising:

a first compartment including a first flavor system in liquid, dry, semi-dry, semi-liquid, or gel form sealed therein, the first flavor system including a combination of compounds which impart aromas, tastes, and/or sensations to an alcoholic beverage formed from the beverage pod; and a second compartment consisting of a liquid consisting of a predetermined amount of an alcohol concentrate sealed therein, wherein the alcohol concentrate is selected from the group consisting of ethanol, or a mixture of water and ethanol;

wherein the first flavor system, when combined with at least the predetermined amount of alcohol concentrate, forms a predetermined quantity of the alcoholic beverage having a predetermined flavor, mouthfeel, and aroma.

18. The beverage pod of claim 17, wherein the first flavor system comprises a combination of compounds selected from the group consisting of oak extract, myrcene, octanoic acid, 2-methylpropanoic acid, butanoic acid, 3-methylbutanoic acid, 2-methylbutanoic acid, decanoic acid, hexanoic acid, 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, ethylfuraneol, 2-phenylethanol, 2-phenylacetic acid, 2-phenylethyl acetate, linalool, acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate, whiskey lactone, 2-methoxyphenol, 4-allyl-2-methoxyphenol, 5-pentyldihydrofuran-2(3H)-one, 4-ethyl-2-methoxyphenol, 4-methyl-2-methoxyphenol, 4-propyl-2-methoxyphenol, 5-hexyldihydrofuran-2(3H)-one, 3-hydroxy-4,5-dimethyl-2(5H)-furanone, dimethyl sulfide, dimethyltrisulfide, 3-(methylthio)-1-propanol, 3-(methylthio)-1-propanal, (E)-2-nonenal, (E,E)-2,4-decadienal, (E,E)-2,4-nonadienal, 4-ethylphenol, 4-methylphenol, 3-methylphenol, 2-methylphenol, phenol, tartaric acid, succinic acid, lactic acid, acetic acid, glycerol, glucose, fructose, L-proline, saccharose, potassium, magnesium, calcium, tannic acid, trans aconitic acid, hops extract, tetra-iso-extract 10%, rho-iso-extract 10%, isomerized hop extract 30%, carrageenan, whey protein, monosodium glutamate, and maltodextrins.

19. The beverage pod of claim 17, wherein the first flavor system includes at least one compound from three or more groups of compounds selected from a cheesy, sweaty aroma first group of compounds, a malty, buttery and/or sweet aroma second group of compounds, a floral and/or honey aroma third group of compounds, a fruity aroma fourth group of compounds, a smoky, coconut, woody aroma fifth group of compounds, a cooked, seasoning, fatty aroma sixth group of compounds, a phenolic/medicinal aroma seventh group of compounds, a sour taste eighth group of compounds, a sweet taste ninth group of compounds, a salty and/or bitter taste tenth group of compounds, an astringent, mouthfeel eleventh group of compounds, a bitter taste twelfth group of compounds, and a umami and mouthfeel taste thirteenth group of compounds.

20. The beverage pod of claim 17, wherein the beverage pod excludes compounds that contribute to spoilage.

21. The beverage pod of claim 17, wherein the first flavor system is a beer flavor system, which forms an alcoholic beverage having the flavor, mouthfeel, and aroma of beer when combined with the predetermined amount of the alcohol concentrate, a predetermined amount of water, and carbon dioxide or nitrogen.

22. The beverage pod of claim 17, wherein the first flavor system is a wine flavor system, which forms an alcoholic beverage having the flavor, mouthfeel, and aroma of wine when combined with the predetermined amount of the alcohol concentrate and a predetermined amount of water.

23. The beverage pod of claim 17, wherein the first flavor system is a whiskey or scotch flavor system, which forms an alcoholic beverage having the flavor, mouthfeel, and aroma of whiskey or scotch when combined with the predetermined amount of the alcohol concentrate and a predetermined amount of water.

24. The beverage pod of claim 17, wherein the alcohol concentrate is ethanol.

25. A beverage pod configured to be received in a receptacle of an apparatus for making an alcoholic beverage, the beverage pod comprising:
a first compartment including a first flavor system in liquid, dry, semi-dry, semi-liquid, or gel form sealed therein, the first flavor system including a combination of compounds which impart aromas, tastes, and/or sensations to an alcoholic beverage formed from the beverage pod; and
a second compartment consisting of a predetermined amount of an alcohol concentrate sealed therein, wherein the alcohol concentrate is selected from the group consisting of ethanol, or a mixture of water and ethanol;
wherein the first flavor system includes at least one compound selected from the group consisting of 3-methylbutanol, 2-methylbutanol, 2,3-butanedione, vanilline, 2-methylpropanol, 3-methylbutanal, 2,3-pentanedione, 2-methylpropanal, 2-methylbutanal, furaneol, ethylfuraneol, acetaldehyde, ethyl butyrate, ethyl-2-methylpropanoate, ethyl octanoate, ethyl hexanoate, ethyl-3-methylbutyrate, ethyl-2-methylbutyrate, (E)-b-damascenone, 3-methylbutyl acetate, 1,1-diethoxyethane, trans-ethyl cinnamate, glycerol, glucose, fructose, L-proline, and saccharose and the first flavor system, when combined with at least the predetermined amount of alcohol concentrate, forms a predetermined amount of the alcoholic beverage having a predetermined taste, mouthfeel, and aroma.

26. The beverage pod of claim 25, wherein the first flavor system includes at least one compound from two or more groups of compounds selected from a sour taste group of compounds, a sweet taste group of compounds, a salty and/or bitter taste group of compounds, an astringent, mouthfeel group of compounds, a bitter taste group of compounds, and a umami and mouthfeel taste group of compounds.

27. The beverage pod of claim 25, wherein the first flavor system is an alcohol-free flavor system.

28. The beverage pod of claim 1, wherein the first flavor system is an alcohol-free flavor system.

29. The beverage pod of claim 25, wherein the beverage pod excludes one or more compounds that contribute to spoilage.

30. The beverage pod of claim 25, wherein the first flavor system is a beer flavor system, which forms an alcoholic beverage having the flavor, mouthfeel, and aroma of beer when combined with the predetermined amount of the alcohol concentrate, a predetermined amount of water, and carbon dioxide or nitrogen.

31. The beverage pod of claim 25, wherein the first flavor system is a wine flavor system, which forms an alcoholic beverage having the flavor, mouthfeel, and aroma of wine when combined with the predetermined amount of the alcohol concentrate and a predetermined amount of water.

32. The beverage pod of claim 25, wherein the first flavor system is a whiskey or scotch flavor system, which forms an alcoholic beverage having the flavor, mouthfeel, and aroma of whiskey or scotch when combined with the predetermined amount of the alcohol concentrate and an amount of water.

33. The beverage pod of claim 25, wherein the alcohol concentrate is ethanol.

* * * * *